United States Patent [19]

Guerra Cisneros et al.

[11] Patent Number: 5,697,602
[45] Date of Patent: Dec. 16, 1997

[54] CONTAINER FOR A REFRIGERANT SYSTEM FILTER

[75] Inventors: Carlos J. Guerra Cisneros; Jose A. Rico Mora, both of Jalisco, Mexico

[73] Assignee: Valycontrol S.A. de C.V., Mexico

[21] Appl. No.: 332,126

[22] Filed: Oct. 31, 1994

Related U.S. Application Data

[60] Division of Ser. No. 170,388, Dec. 20, 1993, Pat. No. 5,395,509, which is a continuation-in-part of Ser. No. 956,452, Oct. 2, 1992, abandoned, which is a continuation-in-part of Ser. No. 908,982, Jul. 6, 1992, abandoned.

[51] Int. Cl.$^6$ ............................................. F16L 55/00
[52] U.S. Cl. ............................................. 220/328; 220/293
[58] Field of Search ............................... 220/328, 325, 220/293, 298

[56] References Cited

U.S. PATENT DOCUMENTS

| | | | |
|---|---|---|---|
| 1,324,981 | 12/1919 | Roesch | 220/293 X |
| 1,700,503 | 1/1929 | Lyon et al. | 220/293 X |
| 1,907,747 | 5/1933 | Daman | 220/325 X |
| 2,578,021 | 12/1951 | Sandberg | 220/298 X |
| 3,006,499 | 10/1961 | Corbett | 220/293 |
| 3,278,071 | 10/1966 | Pangburn | 220/328 |
| 5,329,971 | 7/1994 | Conon | 220/293 X |

*Primary Examiner*—Steven M. Pollard
*Attorney, Agent, or Firm*—Bush, Riddle & Jackson, L.L.P.

[57] ABSTRACT

A container (10) for a filter (12) has a cylindrical housing (16) receiving the filter (12) and permitting replacement of the filter (12) from an open end. An enlarged diameter fitting (22) is secured about the open end of the cylindrical housing (16) and has retaining lugs (30) for retaining a removable end cap assembly. The removable end cap assembly has an anchor plate (40) with projections (46) that are received within arcuate slots (32) of the end fitting (22). The anchor plate (40) is coupled to an end cap (42) for rotation to position the projections (46) beneath the lugs (30) to restrain outward movement of the anchor plate (40). A single bolt (44) through the end cap (42) is threaded to the anchor plate (40). Rotation of the bolt draws the anchor plate (40) tightly against the lugs (30). The end cap (42) is simultaneously forced against an O-ring (36) disposed on the outer end (50) of fitting (22) for sealing the end cap to the container. An embodiment of FIG. 5 has an adaptor (25A) removably connected to a flange (22A) on the cylindrical housing (16A) to provide a retrofit. An embodiment of FIGS. 6–9 provides visible external indicia on the cap assembly to indicate when the cap (42B) is in fully engaged position with the housing (16B).

17 Claims, 4 Drawing Sheets

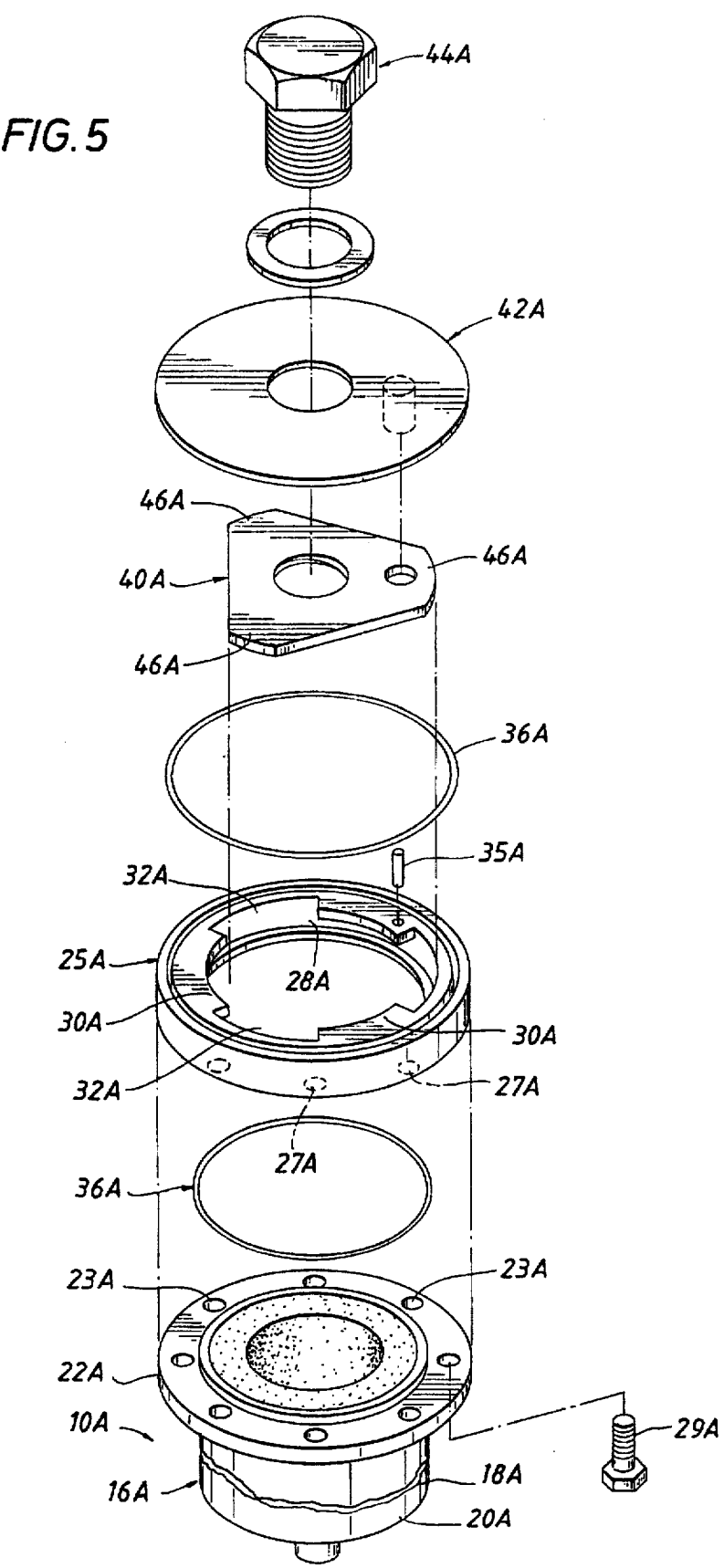

CONTAINER FOR A REFRIGERANT SYSTEM FILTER

CROSS REFERENCE TO RELATED APPLICATIONS

This is a divisional of application Ser. No. 08/170,388 filed on Dec. 20, 1993, 5,395,509, which application is a continuation-in-part of application Ser. No. 07/956,452 filed Oct. 2, 1992, abandoned, which is a continuation-in-part of application Ser. No. 07/908,982 filed Jul. 6, 1992, abandoned.

FIELD OF THE INVENTION

This invention relates to a container for a filter and more particularly to a removable end cap assembly for a cylindrical housing of the container and the method utilized in the replacement of the filter in the cylindrical housing. Still more particularly, this invention relates to a container with a removable end cap assembly adapted to house a replaceable filter core for service in refrigeration and air conditioning systems.

BACKGROUND OF THE INVENTION

Filters in refrigeration and air conditioning systems as well as refrigerant recycling and recovery systems, are utilized for the filtering of Freon (a DuPont trademark), gas and/or liquid ammonia, and other refrigerant gases and/or liquids. A filter to be replaced is normally saturated or at its breakpoint capacity with contaminates which are detrimental to the performance of refrigerant fluids system. Such contaminates include water, solid particulates, acids, varnish, oil, etc., entrained with the refrigerant fluid. Such filters are normally mounted or received within a cylindrical housing. A removable end cap for the cylindrical housing is normally removed for replacement of the used filter with a new unused filter.

Heretofore, it has been common for cylindrical housings receiving replaceable filters for filtering refrigerant gases or liquids to have an outer flange at one end with a removable cap secured to the flange by a plurality of fasteners, such as screws or nuts and bolts. The plurality of fasteners are spaced at arcuate intervals about the flange with the number of fasteners dependent on the size of the flange. It is time consuming to remove a plurality of fasteners, such as four (4) to ten (10), spaced about the perimeter of the flange for removal of a used filter, and then to remount the fasteners and end cap after replacement of the filter.

SUMMARY OF THE INVENTION

The present invention is directed to a container including a cylindrical housing for a filter with a removable end cap assembly releasably fitting on an open end of the cylindrical housing. A single removable fastener is used to secure the end cap assembly on the housing. The end cap may be easily removed by simple loosening of the single fastener for replacement of the filter, and then the cap after replacement of the filter is repositioned securely on the end of the housing by the single fastener.

The container for the filter includes a cylindrical housing having a closed end and an open end with a removable end cap assembly which may be assembled and disassembled from retaining means adjacent the open end of the housing for replacement of the filter. The removable end cap assembly includes a separate anchor member which is inserted within the open end of the cylindrical housing and is rotated for engaging retaining means on the housing to restrain outward movement of the anchor member from the housing. An end cap having a central opening therethrough is then positioned over the open end of the housing in a spaced relation to the anchor member. A fastener which comprises a single threaded bolt is then received within the central opening and threaded onto the anchor member for drawing the end cap tightly against the open end of the cylindrical housing. Such end cap must be secured to maintain positive pressure normally encountered in the operation of refrigerant systems.

One embodiment of the invention is particularly adapted for attachment to the flange of an existing cylindrical housing as a retrofit. A separate adaptor is secured to the flange for receiving the anchor member in this embodiment.

Another embodiment of the invention provides visible external indicia on the cap assembly and adjacent housing to indicate when the cap assembly has been rotated into axial alignment with retaining lugs on the housing for tightening of the cap assembly at a fully engaged position with the lugs.

It is an object of this invention to provide a container for a filter which includes a cylindrical housing and an end cap assembly removably secured to the cylindrical housing by a single fastener thereby providing replacement of a filter by loosening of a single fastener in a minimum of time.

It is another object of this invention to provide a method for assembly and disassembly of such an end cap assembly for the cylindrical housing for replacing a filter in the cylindrical housing in a minimum of time.

A further object is to provide an embodiment of the invention in which externally visible indicia indicated when the cap assembly is in an engaged position with the housing.

Another object is to provide such a removable end cap assembly as a retrofit unit for fitting on a previously existing cylindrical housing.

Other objects, features, and advantages of this invention will become more apparent after referring to the following specification and drawings.

BRIEF DESCRIPTION OF THE DRAWINGS

FIG. 5 is an exploded view of the container of another embodiment of this invention adapted to fit on the flange of a prior cylindrical housing as a retrofit unit;

DESCRIPTION OF THE INVENTION

Figure 1:
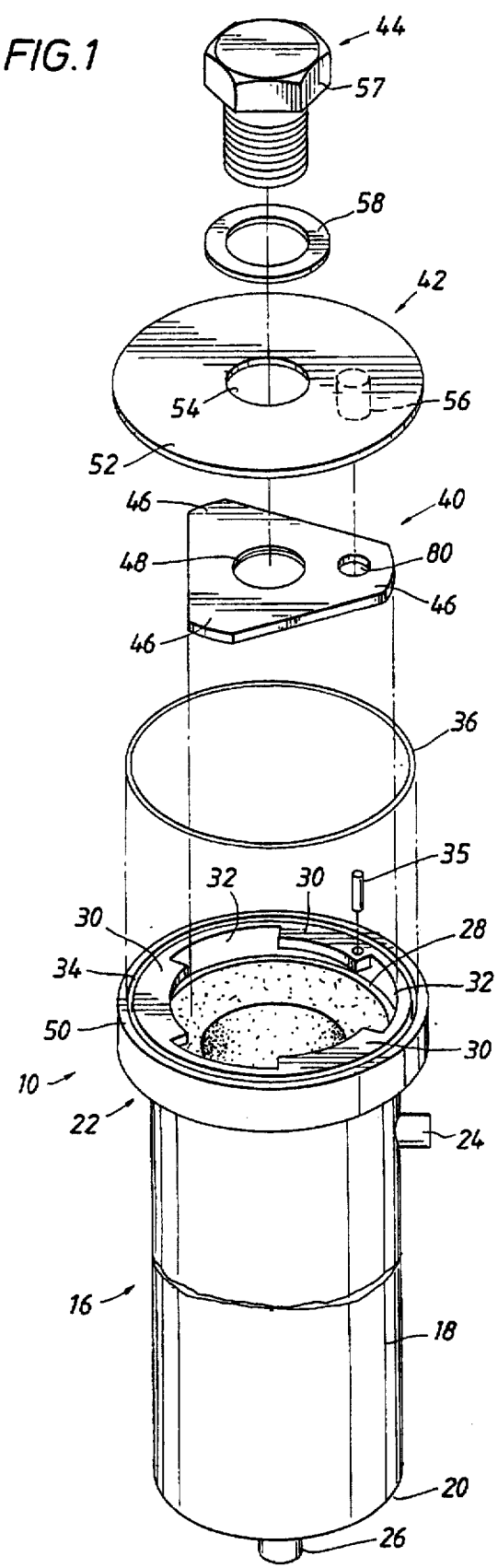
FIG. 1 is an exploded view of the container of an embodiment of this invention for a replaceable filter and including the end cap assembly in disassembled relation.
Figure 2:
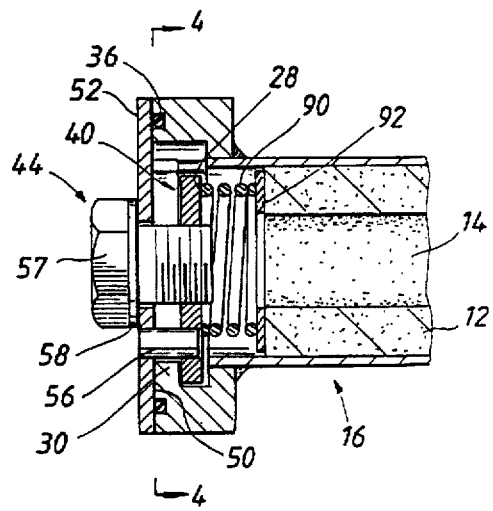
FIG. 2 is an enlarged longitudinal sectional view of the open end portion of the container of FIG. 1 with the end cap assembly shown in assembled position thereon.

Referring now particularly to the embodiment shown in FIGS. 1-4 and more particularly to FIGS. 1 and 2, the container of the present invention is shown generally at 10 for enclosing a filter shown generally at 12 and having a central bore 14 therethrough or, partially therethrough, solid throughout or contained in a receptacle such as a bag, mesh material or even loose filled with filter media. Filter 12 is particularly adapted for use in refrigeration and air conditioning systems as well as refrigerant gas and/or liquid recycling and recovery systems. The refrigerants filtered by filter 12 include Freon (a DuPont trademark), ammonia, and other refrigerant gases and/or liquids. Filter 12 is a so called rechargeable filter which may be removed from container 10, and replaced with a new filter. As illustrated in FIG. 2, a spring 90 and retaining plate 92 maintain the position of filter 12 in the container 10.

Container 10 includes a cylindrical housing generally indicated at 16 having a cylindrical body 18 and a closed end 20. The opposite end of housing 16 has an enlarged diameter fitting generally indicated at 22 and secured (for example, by welding) about the end of cylindrical body 18 to define an open end. Cylindrical body 18 has an inlet port or passage 24 and end 20 has an outlet port or passage 26 for the flow of refrigerant gas and/or liquid. Under certain conditions, the direction of flow may be reversed. Filter 12 may be saturated or at its breakpoint capacity with water, solid particulates, acids, varnish, oil, etc., entrained with the refrigerant gas and/or liquid entering housing 16. Thus, it is desirable to remove a used filter and replace it with a new clean filter 12. For this purpose it is desirable that a simple removable end cap assembly be provided for opening and closing in a minimum amount of time.

Enlarged diameter fitting 22 on the open end of cylindrical housing 16 has an annular abutment or shoulder 28 at the outer end of cylindrical body 18. Arcuate lugs 30 are spaced at arcuate intervals about the inner circumference of fitting 22 and define arcuate slots 32 therebetween. Lugs 30 project radially inwardly over abutment 28 and are spaced axially from abutment 28 to form arcuate grooves therebetween. Fitting 22 has an annular groove 34 on its outer surface which is adapted to receive an O-ring 36. A stop pin 35 is secured to one of the lugs 30.

The end cap assembly of the embodiment of FIGS. 1-4 includes an anchor member 40, an end cap 42, and an externally threaded bolt 44 forming a fastener. Anchor member of plate 40 is of a generally triangular shape with apices forming projections 46. An internally threaded opening 48 is provided centrally of anchor plate 40 and an alignment opening 50 is provided adjacent one of the projections 46. End cap or plate 42 is of a circular shape and defines inner and outer faces 50 and 52. End plate 42 has a central opening 54 and an alignment pin 56 extending from inner face 50. Externally threaded bolt 44 has a hexagonal head 57 and an inner gasket 58 for sealing against end cap 42. Hexagonal head 57 may be manually engaged with a suitable wrench or the like.

Figure 3:
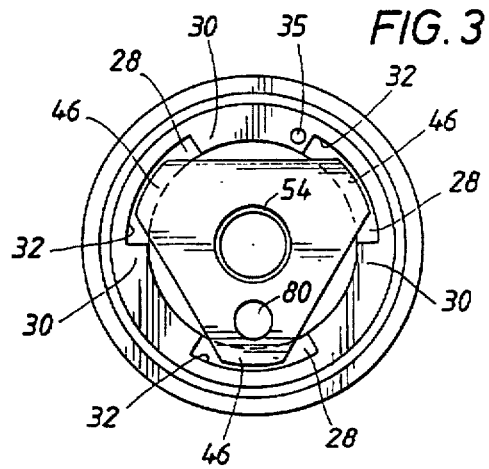
FIG. 3 is an end view of the container of FIG. 1 with the end cap removed and showing the anchor member received within the arcuate slots between the retainer lugs on the cylindrical housing.
Figure 4:
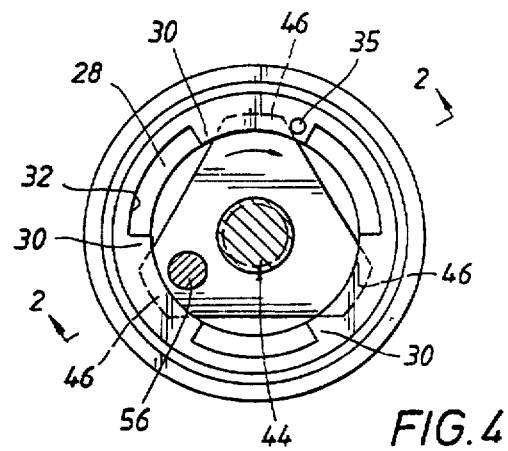
FIG. 4 is a sectional view similar to FIG. 3 but taken along line 4—4 of FIG. 2 and showing the anchor member after rotation beneath the retainer lugs against a stop.
Figure 7:
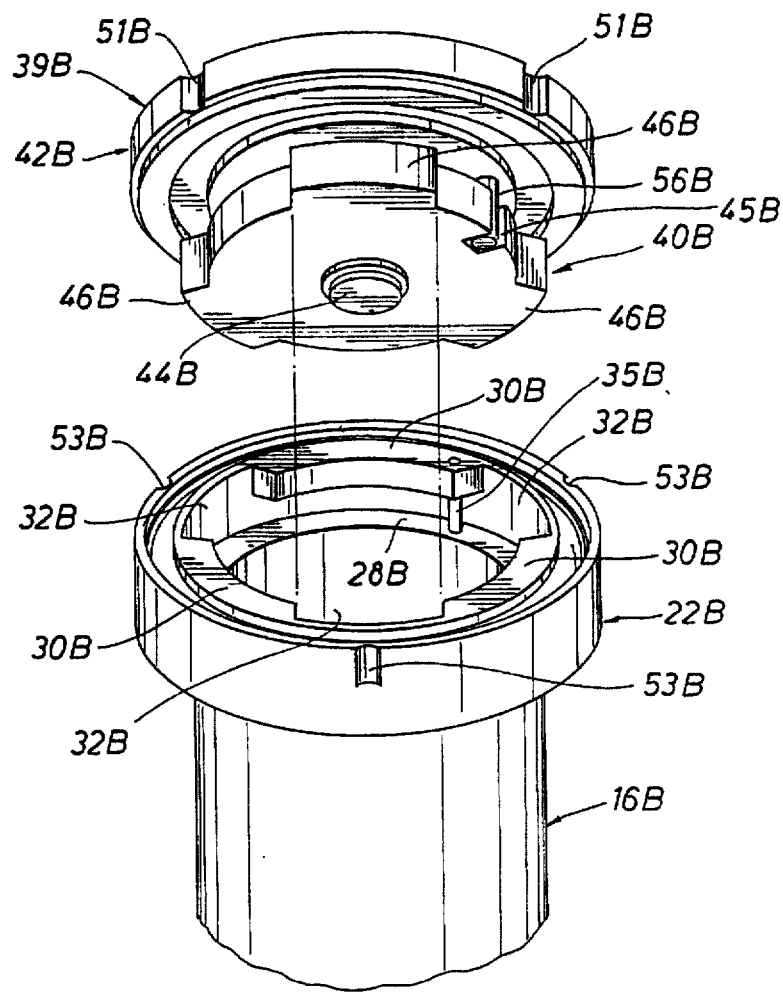
FIG. 7 is a perspective of the cap assembly prior to insertion within the adjacent end of the cylindrical housing.

For assembly of the removable end cap assembly on end fitting 22 of cylindrical housing 16 after a suitable clean filter 12, such as shown in FIG. 2 (or other suitable filter materials or arrangements), has been inserted within cylindrical housing 16, anchor plate 40 is assembled to end cap 42, gasket 58 and threaded bolt 44 by passing the bolt 44 through gasket 58 and end cap 42 and loosely threading the bolt 44 to threads 48 of anchor plate 40. Drive pin 56 of end cap 42 is simultaneously inserted in drive hole 80 of anchor plate 40. Such assembly is then inserted into the open end of fitting 22 until anchor plate 40 bears against shoulder 28 with projections 46 being received within arcuate slots 32 as shown in FIG. 3. Then, end cap 42 is rotated manually in a clockwise direction which causes anchor plate to rotate clockwise because drive pin 56 is in drive hole 80. Accordingly anchor plate projections 46 are rotated under lugs 30 with one projection 46 engaging stop pin 35 to limit the rotation of plate 40 and to align projections 46 axially with lugs 30 as shown in FIG. 4. Thus, outward movement of anchor prate 40 is restrained or blocked by lugs 30. Upon tightening of bolt 44 by a suitable wrench or the like, projections 46 of anchor plate 40 are drawn tightly against lugs 30 with O-ring 36 sealing against inner face 50 of end cap 42 and gasket 58 sealing against outer face 52 of end cap 42. Thus, the end cap assembly has been assembled, closed and secured with the use of only a single fastener or bolt 44.

For disassembly of the end cap assembly for replacement of filter 12, bolt 44 is first turned counterclockwise to release the outward force on anchor member 40. Next, end cap 42 is manually rotated in a counterclockwise direction as viewed in FIG. 4 to simultaneously rotate anchor plate 40 so as to align projections 46 axially with arcuate slots 32. Then, the entire end cap assembly is removed to permit the filter 12 (or other filter arrangements) to be removed and replaced with another filter 12.

Referring now to the embodiment of the invention shown in FIG. 5 for fitting on the end flange of a prior filter container, the prior filter container 10A has a cylindrical housing 16A defining a cylindrical body 18A and a closed end 20A. The opposite open end of cylindrical housing 16A has a radially extending flange 22A with a plurality of arcuate spaced openings 23A therein. An adaptor shown generally at 25A has internally threaded blind openings 27A aligned with openings 23A and secured by externally threaded bolts 29A tightly against flange 22A. O-rings 36A provide seals on opposed sides of adaptor 25A.

Adaptor 25A is similar to enlarged diameter fitting 22 in the embodiment shown in FIGS. 1-4 and has an annular shoulder or abutment 28A. Arcuate lugs 30A are spaced at arcuate intervals about the inner circumference of adaptor 25A and define arcuate slots 32A therebetween. Lugs 30A project radially inwardly over abutment 28A and are spaced axially from abutment 28A to form arcuate grooves therebetween. A stop pin 35A is secured to one of the lugs 30A. The removable end cap assembly which includes anchor member 40A with projections 46A, end cap 42A, and externally threaded bolt 44A are similar to the embodiment of FIGS. 1-4.

For assembly with anchor plate 40A loosely assembled to end cap 42A and bolt 44A loosely threaded onto anchor plate 40A, projections 46A of anchor plate 40A are received within arcuate slots 32A until anchor plate 40A engages shoulder 28A of adaptor 25A. Then, end cap 42A is rotated manually until one projection 46A of anchor plate 40A engages stop pin 35A to align projections 46A axially with lugs 30A. Bolt 44A is then tightened to draw projections 46A tightly against lugs 30A as in the embodiment of FIGS. 1-4. Thus, adaptor 25A forms a retaining means for the removable end cap assembly. Disassembly of the end cap assembly is likewise similar to the embodiment of FIGS. 1-4.

Referring now to FIGS. 6-9, another embodiment of this invention is illustrated which is particularly adapted to provide visible external indicia to indicate when the cap assembly is axially aligned with the retaining lugs on the housing to prevent inadvertent release of the cap assembly from the housing. Container 10B has a cylindrical housing 16B generally similar to cylindrical housing 16 of the embodiment of FIGS. 1–4. Housing 16B has a cylindrical body 18B and an enlarged diameter end fitting 22B about the end of housing 16B. End fitting 22B includes an inner annular shoulder 28B and arcuate slots 32B between projecting lugs 30B. A stop pin 35B extends from a lug 30B to project within shoulder 28B for limiting and stopping the rotation of the end cap assembly generally indicated at 39B in both directions of rotation. End fitting 22B has an annular groove 34B to receive O-ring 36B.

End cap assembly 39B includes an anchor or retaining member 40B, an end cap 42B, and an externally threaded bolt 44B forming a fastener. Bolt 44B is freely mounted within a central opening in cap 42B. Retaining member 40B has projections or lugs 46B and an indentation 45B for receiving a pin 56B secured to end cap 42B so that cap 42B and retaining member 40B rotate together. An internally threaded opening 48B is provided centrally of retaining member 40B to receive bolt 44B in threaded relation. It is noted that lugs 46B are of dimensions to fit within arcuate slots 32B and are arranged at 120° arcuate intervals. An annular extension or projection 47B on the inner face of cap 42B is adapted to be received within groove 34B for compressing O-ring 36B.

Figure 8:
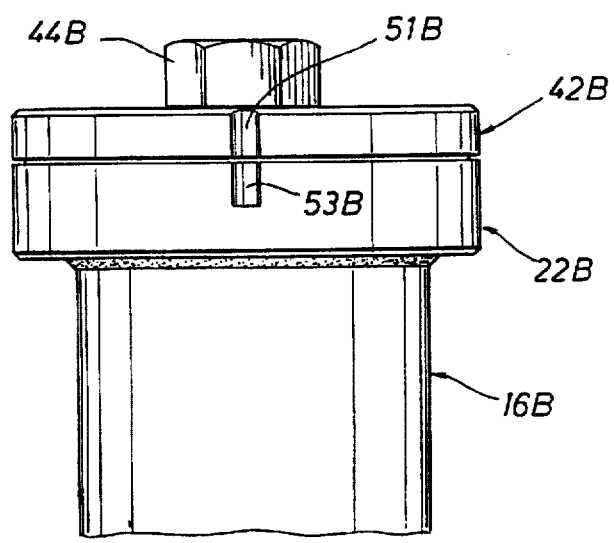
FIG. 8 is a perspective similar to FIG. 7 after the cap assembly has been inserted within the housing and rotated into a fully engaged position.

Cap assembly 39B is removably secured on housing 16B after insertion of filter 12B and spring 90B within housing 16B. Lugs 46B are first axially aligned with arcuate slots 32B and then pushed inwardly against shoulder 28B. Then cap assembly 39B is rotated 60° so that lulls 46B are axially aligned with lugs 30B on enlarged end fitting 22B upon contact of an adjacent lug 46B with stop pin 35B. To indicate that lugs 30B and 46B are axially aligned for drawing lugs 46B tightly against lugs 30B upon rotation of bolt 44B, indentations 51B arranged at 120° to each other are positioned externally on cap 42B and indentations 53B arranged at 120° to each other are positioned externally on enlarged end fitting 22B. Indentations 51B when lugs 46B are axially aligned with arcuate slots 32B are positioned circumferentaily around 60° from indentations 53B. Upon rotation of cap 42B around 60° after lugs 46B are received within slots 32B, lugs 46B are in axial alignment with lugs 30B, and indentations 51B and 53B are in alignment as shown in FIG. 8. Upon tightening of bolt 44B in this aligned position of lugs 30B and 46B, lugs 30B and 46B are drawn together in full engagement. The refrigerant gases filtered by the present invention may have a working pressure as high as 500 psi and it is necessary to have lugs 30B and 46B properly aligned before tightening of bolt 44B to minimize possible accidents. The aligned marks or indentations 51B and 53B insure that lugs 30B and 46B are properly aligned.

For removable attachment of container 10B to a plate, bracket, or the like, an end cover plate 20B is shown on the end of housing 16B opposite cap assembly 39B. Cover plate 20B has an outwardly flanged portion to form a flat central portion 61B. An outlet tube 21B communicates with an outlet port 26B in the flanged portion of cover plate 20B. Flat or planar central portion 61B on end cover plate 20B has a U-shaped bracket or clip 63B secured thereto. A pair of externally threaded studs 65B extend outwardly from bracket 63B. Internally threaded nuts 67B are threaded onto studs 65B. For securement of container 10B, studs 65B are received within suitable openings of a supporting plate or the like shown in broken lines at 69B and nuts 67B are then threaded onto studs 65B.

Figure 6:
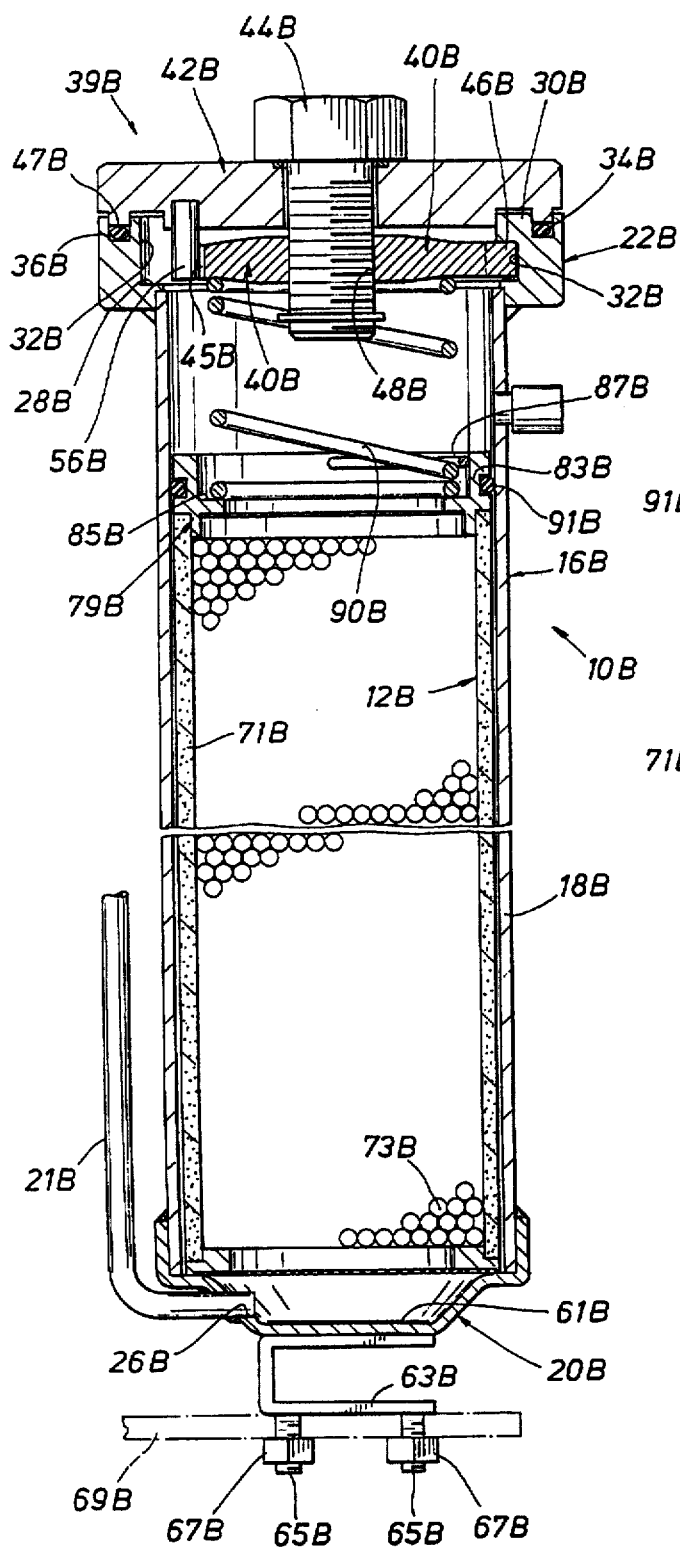
FIG. 6 is a longitudinal sectional view of a further embodiment of this invention in which externally visible indicia indicated when the cap assembly is in a fully engaged position with the cylindrical housing.
Figure 9:
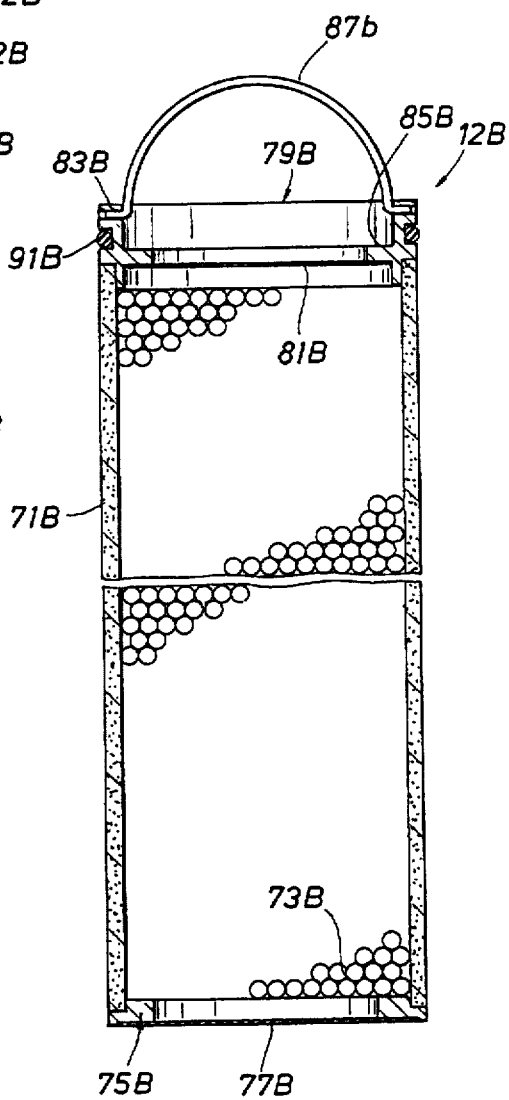
FIG. 9 is a longitudinal sectional view of the filter shown removed from the housing.

Referring to FIG. 9, filter 12B is shown removed from housing 16B. Filter 12B includes a tubular body 71B formed of a fibrous cellulose material and filled with a granular desiccant 73B. A lower annular end cap 75B fitted on a lower end of tubular body 71B is formed of a nylon ring and has a porous fine mesh metal screen material 77B secured thereto for containing the granular desiccant 73B. An upper annular end cap 79B fits within the upper end of tubular body 71B and is formed of a nylon ring having a porous fine mesh metal screen material 81B secured thereto for containing the granular desiccant 73B. End cap 79B includes an outer flange 83B defining a shoulder 85B. A wire handle 87B has its ends pivotally mounted on flange 83B and is pivoted manually between a raised operable position as shown in FIG. 9 for removal of filter 12B from housing 16B and a recessed inoperable position fitting against shoulder 85B as shown in FIG. 6. An O-ring 91B fits within an annular groove in end cap 79B. Spring 90B has one end fitting within flange 83B and bottomed against shoulder 85B.

It is to be understood that various other embodiments of the present invention may be employed in a satisfactory manner. For example, the anchor plate may be provided with a central externally threaded stud extending through an end cap with a nut threaded onto the end of the stud against the end cap. Retaining means other than lugs may also be used for anchoring the anchor plate within the open end of the cylindrical housing. The housing, end fitting, and end cap assembly of this invention may be constructed from various materials such as steel, aluminum, copper, brass, plastic or other suitable materials.

While preferred embodiments of the present invention have been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A container for a replaceable filter comprising:
    a generally cylindrical housing having a closed end and an open end;
    end cap retaining means on said housing adjacent the open end thereof;
    a removable end cap assembly adapted to be mounted on and removed from said retaining means and including:
        an anchor member received within the open end of said cylindrical housing and interfitting with said end cap retaining means on said housing so that outward movement of said anchor member is restrained;
        an end cap having a central opening therein and mounted against the open outer end of said cylindrical housing for alignment with said anchor member;
        a fastener extending through the central opening in said end cap and secured between said anchor member and said end cap, said fastener being manually rotated and restrained by said anchor member for drawing said end cap tightly against the open outer end of said housing;
    said housing including a plurality of lugs spaced at arcuate intervals about the open end of said cylindrical body and projecting inwardly relative to the longitudinal axis of the housing to define a plurality of slots between said lugs, said anchor member having projections received within said slots and adapted to be rotated for positioning under said lugs thereby to restrain said anchor member against outward movement; and means connecting said end cap to said anchor member for simultaneous rotation so that rotation of said end cap simultaneously rotates said anchor member for selective positioning of said projections under said lugs.

2. A container as set forth in claim 1 wherein stop means are provided to limit rotation of said anchor member when said projections are aligned with said lugs for restraining outward movement of said anchor plate.

3. A container as set forth in claim 1 wherein said projections are urged tightly outwardly against said lugs upon rotation of said fastener into a tightened position.

4. A container as set forth in claim 1 wherein a resilient O-ring is positioned between said end cap and said housing for sealing therebetween upon tightening of said end cap against said housing.

5. The container of claim 1 further comprising:
a first fluid port in said closed end and a second fluid port in said cylindrical housing to provide fluid flow for a refrigerant fluid between said ports through said filter.

6. A container for a replaceable filter comprising:
a generally cylindrical housing having a closed end and an open end, said housing having a radially extending flange adjacent said open end and a plurality of openings accurately spaced along said flange;
end cap retaining means on said housing adjacent the open end thereof including an annular adaptor adjacent and in axial alignment with said flange;
a removable end cap assembly adapted to be mounted on and removed from said retaining means and including:
an anchor member received within the open end of said cylindrical housing and interfitting with said end cap retaining means on said housing so that outward movement of said anchor member is restrained;
an end cap having a central opening therein and mounted against the open outer end of said cylindrical housing for alignment with said anchor member;
a central fastener extending through the central opening in said end cap and secured between said anchor member and said end cap, said central fastener being manually rotated and restrained by said anchor member for drawing said end cap tightly against the open outer end of said housing;
a plurality of additional fasteners extending through said plurality of openings in said flange for securing said adaptor; and
means connecting said end cap to said anchor member for simultaneous rotation so that rotation of said end cap simultaneously rotates said anchor member for positioning of said anchor member at a desired position.

7. The container of claim 6 further comprising:
a first fluid port in said closed end and a second fluid port in said cylindrical housing to provide fluid flow for a refrigerant fluid between said ports through said filter.

8. A container for a replaceable filter comprising:
a generally cylindrical housing having a closed end and an open end;
end cap retaining means comprising an enlarged diameter fitting fixed to said housing adjacent the open end thereof;
a removable end cap assembly adapted to be mounted on and removed from said retaining means and including:
an anchor member received within the open end of said cylindrical housing and interfitting with said end cap retaining means on said housing so that outward movement of said anchor member is restrained;
an end cap having a central opening therein and mounted against the open outer end of said cylindrical housing for alignment with said anchor member;
a fastener extending through the central opening in said end cap and secured between said anchor member and said end cap, said fastener being manually rotated and restrained by said anchor member for drawing said end cap tightly against the open outer end of said housing;
said housing including a plurality of lugs spaced at arcuate intervals about the open end of said cylindrical body and projecting inwardly relative to the longitudinal axis of the housing to define a plurality of slots between said lugs, said anchor member having projections received within said slots and adapted to be rotated for positioning under said lugs thereby to restrain said anchor member against outward movement; and
means connecting said end cap to said anchor member for rotation with said end cap to a desired position.

9. The container of claim 8 further comprising:
a first fluid port in said closed end and a second fluid port in said cylindrical housing to provide fluid flow for a refrigerant fluid between said ports through said filter.

10. In a container having a cylindrical housing with an open end for receiving a filter therein and retaining means adjacent said open end; a removable cap assembly for fitting in sealing relation against said open end of said cylindrical housing comprising:
an anchor member having a central internally threaded opening therein and fitting within the open end of said cylindrical housing, said anchor member having projections thereon interfitting with said retaining means on said housing for restraining outward movement of said anchor member;
an end cap connected to said anchor member for rotation therewith and having a central opening therein alignable with said internally threaded central opening; and
a threaded fastener received within said central opening of said end cap and in threaded engagement with said internally threaded opening of said anchor member, said fastener being rotated into a tightened position for tightly urging said projections on said anchor member against said retaining means on said housing and tightly mounting said end cap on said housing;
said retaining means including an enlarged diameter fitting secured to said cylindrical housing adjacent said open end.

11. In a container as set forth in claim 10 wherein said enlarged diameter fitting includes a radially extending flange fixed to said cylindrical housing and an annular adaptor removably connected to said flange.

12. In a container as set forth in claim 10 wherein said flange and said adaptor have arcuately spaced openings aligned axially, and fasteners within said aligned openings removably connect said adaptor to said flange.

13. A container for a replaceable filter comprising:
a generally cylindrical housing having a closed end and an enlarged diameter end fitting defining an open end, said enlarged diameter end fitting having a plurality of laterally extending lugs spaced at arcuate intervals about said open end and defining a plurality of slots between said lugs;
a removable end cap assembly adapted to be mounted over said open end and including:
an anchor member having laterally extending interfitting lugs adapted to be received within said slots and to be rotated beneath said lugs on said enlarged diameter end fitting for subsequent engagement;

an end cap mounted against the open outer end of said cylindrical housing for alignment with said anchor member and connected to said anchor member for rotation therewith;

means connecting said end cap to said anchor member for simultaneous rotation thereof; and fastener means connecting said end cap and said anchor member to each other for moving said anchor member axially toward and away from said end cap, said end cap being manually rotated upon positioning of said interfitting lugs on said anchor member within said slots on said enlarged diameter end fitting for rotating said interfitting lugs on said anchor member beneath said lugs on said enlarged diameter end fitting in axial alignment; said fastener means being tightened upon alignment of said interfitting lugs and said lugs in a fully engaged position for tight engagement of said lugs and interfitting lugs for securement of said removable end cap assembly on said housing.

14. A container as set forth in claim 13 wherein stop means are provided on said enlarged diameter fitting to limit rotation of said cap and anchor member past a position where said lugs and interfitting lugs are in axial alignment.

15. A container as set forth in claim 14 wherein visible indicia are provided externally on said cap and said enlarged diameter end fitting to indicate alignment of said lugs and interfitting lugs.

16. A container as set forth in claim 13 wherein an end cover plate forms a closed end for said housing and has a flat central portion; and a support bracket is secured to said flat central portion for mounting said container.

17. A container as set forth in claim 16 wherein a laterally extending outlet port is formed in said end cover plate adjacent said flat central portion.

* * * * *